US008419336B2

(12) United States Patent
Fletcher et al.

(10) Patent No.: US 8,419,336 B2
(45) Date of Patent: Apr. 16, 2013

(54) DEVICE FOR DISTRIBUTING MATERIAL INTO AN ENCLOSURE

(75) Inventors: Jeremy Fletcher, Stockton-on-Tees (GB); Brian Kibble, Stockton-on-Tees (GB); Harald Sprenger, Freistadt (AT); Kurt Wieder, Schwertberg (AT); Johann Wurm, Bad Zell (AT)

(73) Assignees: VAI Industries (UK) Limited (GB); Voest-Alpine Industrieanlagenbau GmbH & Co. (AT)

( * ) Notice: Subject to any disclaimer, the term of this patent is extended or adjusted under 35 U.S.C. 154(b) by 1044 days.

(21) Appl. No.: 11/720,290

(22) PCT Filed: Nov. 16, 2005

(86) PCT No.: PCT/EP2005/012281

§ 371 (c)(1), (2), (4) Date: Sep. 4, 2007

(87) PCT Pub. No.: WO2006/056350

PCT Pub. Date: Jun. 1, 2006

(65) Prior Publication Data

US 2008/0008563 A1 Jan. 10, 2008

(30) Foreign Application Priority Data

Nov. 26, 2004 (EP) .................................... 04257351

(51) Int. Cl.
*B65G 25/00* (2006.01)

(52) U.S. Cl.
USPC .......................................... 414/207; 414/300

(58) Field of Classification Search .................. 414/174, 414/184, 193, 195, 204, 172, 194, 199, 207, 414/208, 293, 300; 248/182.1
See application file for complete search history.

(56) References Cited

U.S. PATENT DOCUMENTS

| | | | | |
|---|---|---|---|---|
| 1,774,800 | A * | 9/1930 | Luedtke | 193/16 |
| 3,651,964 | A | 3/1972 | Nieboer | 214/36 |
| 3,693,956 | A * | 9/1972 | Nieboer | 414/204 |
| 3,972,426 | A | 8/1976 | Tachiyama | 214/35 |

(Continued)

FOREIGN PATENT DOCUMENTS

| | | |
|---|---|---|
| DE | 871 762 | 3/1953 |
| DE | 1 261 443 | 2/1968 |
| EP | 0 101 846 | 3/1984 |
| JP | 48-12285 | 4/1973 |

(Continued)

OTHER PUBLICATIONS

Japanese Office Action dated Aug. 2, 2011 issued in Application Serial No. JP-2007-541778, including an English translation thereof.

*Primary Examiner* — Saul Rodriguez
*Assistant Examiner* — Glenn Myers
(74) *Attorney, Agent, or Firm* — Ostrolenk Faber LLP

(57) ABSTRACT

To distribute charging material evenly in an enclosure such as a furnace or reactor to ensure its best operation, a charging material distribution inside the enclosure 30 of the furnace is used. It has a movable charging device 4 in the form of a spout through which the charging material is fed into the enclosure. The distribution device is small in size and light in weight. It has a moveable charging device 4 in the form of a spout which is suspended on a gimbal suspension 2 on a fixed charging device, which is in the form of a chute 3 inside the enclosure.

13 Claims, 2 Drawing Sheets

U.S. PATENT DOCUMENTS

| | | | | | |
|---|---|---|---|---|---|
| 4,032,024 | A | | 6/1977 | Genge et al. | 214/35 R |
| 4,042,130 | A | | 8/1977 | Legille et al. | 214/35 R |
| 4,151,047 | A | * | 4/1979 | Legille et al. | 202/262 |
| 4,243,351 | A | * | 1/1981 | Legille et al. | 414/206 |
| 4,306,827 | A | | 12/1981 | Tsutsumi et al. | 414/160 |
| 4,360,305 | A | | 11/1982 | Dorsch | 414/208 |
| 4,525,120 | A | * | 6/1985 | Legille et al. | 414/160 |
| 4,547,116 | A | * | 10/1985 | Legille et al. | 414/160 |
| 4,575,790 | A | | 3/1986 | Legille et al. | |

FOREIGN PATENT DOCUMENTS

| | | |
|---|---|---|
| JP | 49-101207 | 9/1974 |
| JP | 51-56704 | 5/1976 |
| JP | 51-77505 | 7/1976 |
| JP | 55-11477 | 1/1980 |
| JP | 56-71783 | 6/1981 |
| JP | 58-207303 | 2/1983 |
| JP | 59-225281 | 12/1984 |
| WO | 03/002768 | 1/2003 |

* cited by examiner

DEVICE FOR DISTRIBUTING MATERIAL INTO AN ENCLOSURE

CROSS REFERENCE TO RELATED APPLICATION

The present application is a 35 U.S.C. §§371 national phase conversion of PCT/EP2005/012281, filed Nov. 16, 2005, which claims priority of European Application No. 04257351.9, filed Nov. 26, 2004. The PCT International Application was published in the English language.

BACKGROUND OF THE INVENTION

The present invention relates to a device for distributing material into an enclosure comprising a fixed charging means, a movable charging means, the movable charging means being suspended on gimbals, and at least one actuating means for actuating the gimbal suspension.

For charging material into furnaces or reactors, e.g. like a shaft or metallurgical aggregate reactor, a blast furnace, a melter gasifier or a reduction shaft, or similar devices, it is advantageous or even necessary for the operation of the device to distribute the charging material evenly or according to a certain charging pattern. To this end charging and distribution devices are known from the prior art comprising a movable spout inside the enclosure of the furnace or reactor through which charging material is fed to the furnace or reactor.

From U.S. Pat. No. 3,972,426, a gimbal suspension of a movable spout is known, having a gear box in which the spout is arranged. The gear box is supported by a first shaft in the casing of the blast furnace. A second shaft is supported by the gear box and is arranged perpendicular to the first shaft. The gear box, together with the second shaft and the spout, are tilted around on axis of rotation with the first shaft. To tilt the spout around the second axis of rotation, a ring gear is provided in the gear box which meshes with a first pinion arranged on a drive shaft and a second pinion arranged on the second shaft. Thus, the spout can be tilted in two directions. The first shaft carries the gear box, the second shaft as well as the spout and consequently the shaft and the bearings need to be designed for heavy loads and great torques. Owing to the gear box with the ring gear, such a device is bulky and requires quite a lot space within the furnace. Such a device is also heavy which makes it unsuitable for a high speed control of the charging procedure because of the weight and inertia of the charging device. Moreover, the gear box must be cooled in order to withstand the high temperatures within a blast furnace.

U.S. Pat. No. 4,042,130 discloses a charging device with a movable spout which is suspended on a universal joint formed by a spherical surface to which the spout is adjustably attached. The spout has a bearing with an internal surface that is slightly concave, having a radius of curvature equal to the radius of the spherical surface so that the bearing fits to the periphery of the spherical surface. The spout is actuated by a minimum of three pressure cylinders which are attached to the spout. Such a device requires accurate manufacture and control of the actuating devices, because in case the spherical guide is loose, the system is very slack. On the other hand, in case there is hardly any clearance, a very accurate control of the three actuating devices is necessary to avoid unnecessary high friction in the spherical guide. Such a device is therefore sensitive and difficult to manufacture and control.

U.S. Pat. No. 4,306,827 shows a gimbal suspension of a moveable spout for charging material into a blast furnace. An outer ring is tiltably mounted on the casing of the furnace on two trunnions and carries a tiltably mounted inner ring arranged on a shaft, at which inner ring the spout is attached. The actuating device comprises a multiple jointed drive shaft which is fixed to the shaft of the inner ring. By rotating the drive shaft, the outer ring is tilted and by axially displacing the drive shaft, the inner ring is tilted. Hence, the spout can be moved to any point within a certain area by tilting the inner and outer ring. The actuating drive can be arranged centered above the spout or sidewards. In case it is arranged centered above the spout, an off-center charging to the spout would be necessary which is more complex. If the drive is arranged sidewards of the spout a big volume inside the furnace would be required. The drive shaft is for both variants arranged inside the enclosure and is rotatable and moveable in an axial direction which makes it necessary to protect the shaft against heat, dust and accretions to ensure functioning of the actuation device.

SUMMARY OF THE INVENTION

It is one object of the present invention to overcome the above-described problems of the prior art. A further object of the invention is a device for charging material into an enclosure which is small in size and resistant to high temperatures and dusty atmospheres and which can be integrated into a high speed control of the charging movement.

These objects are solved by using an inner ring of the gimbal suspension that is tiltably arranged on two tilting means which are mounted on the fixed charging means forming a first axis of rotation and an outer ring of the gimbal suspension that is tiltably arranged on further two tilting means which are mounted on the inner ring forming a second axis of rotation. The outer ring is attached to the moveable charging means and the actuating means is attached to the outer or inner ring. Such an arrangement can be designed to be of light weight and of small dimension which ensures that it can be rapidly moved, hence it may also be employed with a high speed control. Because the inventive device is directly mounted on the fixed charging means, it is small in size and requires only little space inside the enclosure.

Preferably two actuating means are provide which makes the control of the movement of the moveable charging means easier. Each of the actuating means advantageously comprises an actuating rod and/or a pressure cylinder, which are angularly displaced and attached to the outer ring or inner ring.

An especially advantageous arrangement provides actuating rods which are angularly displaced from the first and second axis of rotation, which axes are preferably arranged perpendicularly. This allows easy control of the moveable spout simply by employing basic mutually dependent mathematical functions which is even easier when the angular displacement of the first actuating rod to the second actuating rod is set to substantially 90° and the angular displacement of the first actuating rod to the first axis is set in a range of 0° to ±90°, and preferably substantially ±45°.

When the actuating rods are arranged substantially vertically, it is possible to arrange them very close to the fixed chute which is a very space saving arrangement.

In case the driving means comprises a pressure cylinder, which is preferably arranged substantially horizontally, and a movement transformation means for transforming the preferably horizontal, movement of the pressure cylinder into the vertical movement of the actuating rod, it is possible to arrange the drive means outside the enclosure. With a driving means accessible from outside, easy maintenance of the driving means is possible.

With a shielding means for protecting the gimbal suspension and/or the actuating rods against heat and/or dust in the enclosure, the resistance against heat and dust inside the enclosure is further increased.

BRIEF DESCRIPTION OF THE DRAWINGS

The present invention will be described exemplarily by reference to the accompanying drawings FIGS. 1 to 4 wherein like reference numerals refer to like elements, in which.

DESCRIPTION OF A PREFERRED EMBODIMENT

Figure 1:
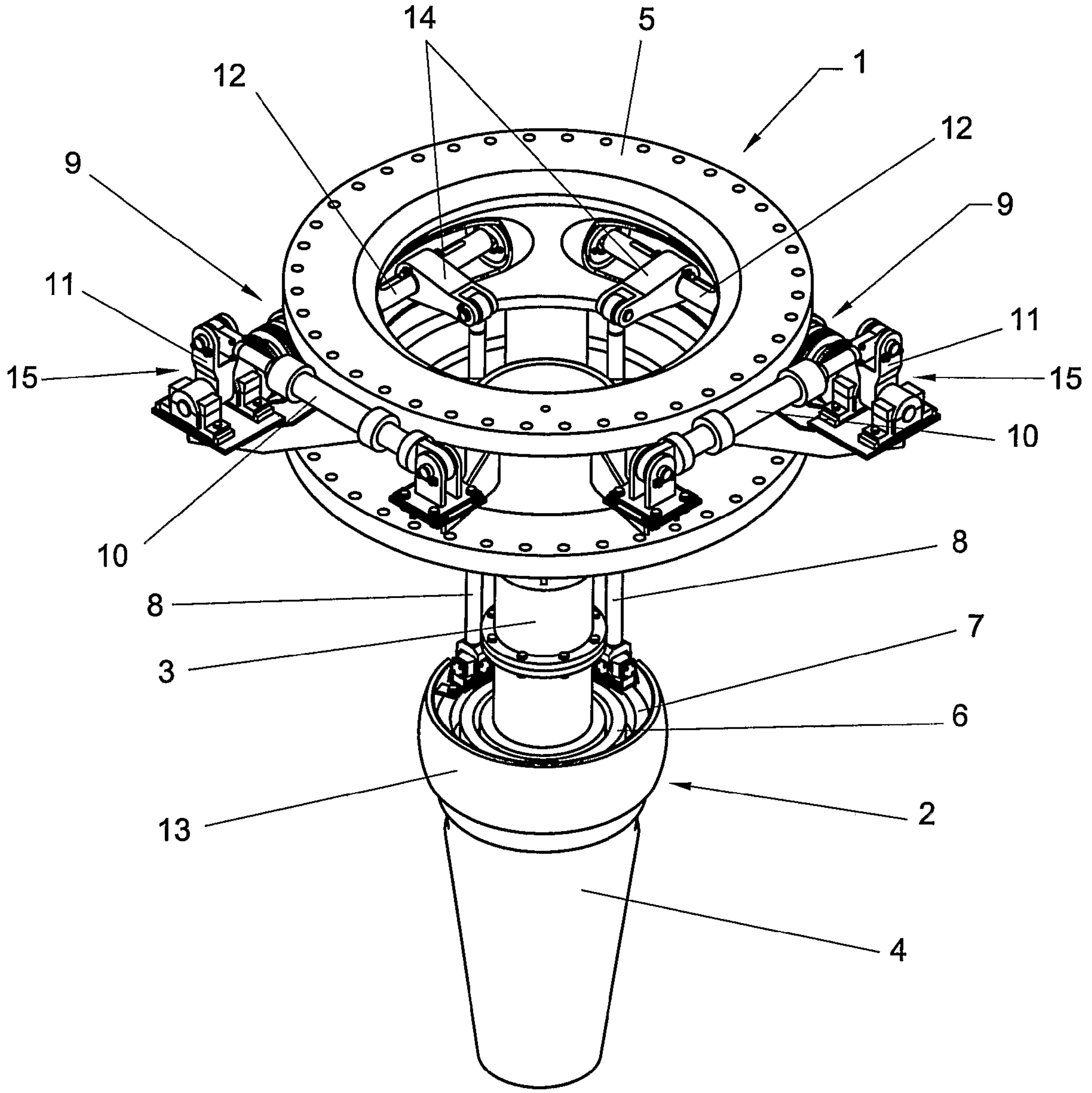
FIG. 1 depicts a 3D view of the inventive device for charging material.

The distribution device 1, as best shown in FIG. 1, comprises a fixed charging means 3 in the form of a tubular chute, having one end mounted to a flange 5 for fixing the device into an operating position, e.g. into a blast furnace. The other end of the fixed charging means 3 is in the form of a chute at which a gimbal suspension 2 is provided, at which a movable charging means 4 in form of a tubular spout is mounted.

The gimbal suspension 2 comprises an inner ring 6 and an outer ring 7. The inner ring 6 is tiltably arranged on its inner side on two tilting means 21 in the form of respective bolts or trunnions, e.g. on bearings, which are mounted to the fixed charging means 3 which is in the form of a tubular chute. The two tilting means 21 in form of bolts are arranged oppositely thus forming a first axis of rotation 23 around which the inner ring 6 can be tilted with respect to the fixed charging means 3 which is in the form of a chute. On the outer side of the inner ring 6, two further tilting means 20 in form of bolts or trunnions are arranged, on which the outer ring 7 is tiltably arranged, e.g. on bearings, thus forming a second axis of rotation 22 around which the outer ring 7 can be tilted with respect to the inner ring 6. The movable charging means 4 in the form of a spout is mounted to the outer ring 7 and hence is moved together with the outer ring 7. The fixed charging means 3 in form of a chute, the inner ring 6, the outer ring 7 and the movable charging means 4 in the form of a chute are arranged substantially concentric. The movable charging means 4 in the form of a spout can be moved to any point of a motion area, defined by the maximum allowed tilting range of the inner ring 6 and outer ring 7 and the length of the movable charging means 4 in form of a spout, simply by superposition of the tilting motions of the inner and outer ring 6, 7. Hence, charging material which is fed through the fixed charging means 3 in the form of a chute and moveable charging means 4 in the form of a spout can be distributed inside the enclosure 30 according to a predefined pattern by controlling the movement of the moveable charging means 4 in the form of a spout.

For actuating the gimbal suspension 2, an actuating means 15 is provided. In the example shown, it comprises two actuating rods 8 and two driving means each comprising a movement transformation means 9 and a pressure cylinder 10. The pressure cylinder 10 is arranged basically horizontally and is articulated with a lever 11 fixed to a shaft 12. A second lever 14 is fixed to the shaft 12 and is rotated together with the shaft. The second lever 14 is articulated with the actuating rod 8 which is articulated with the outer ring 7 and is basically arranged vertically. Therefore, the horizontal movement of the pressure cylinder 10 is transformed into a substantially vertical movement of the actuating rod 8 by the movement transformation means 9, comprising the levers 11, 14 and a shaft 12. But it is obvious that the actuating means or movement transformation means could also be arranged differently or could comprise additional or other components as described above. It is further possible that the pressure cylinders 10 may act directly on the inner or outer ring 6, 7, without movement transformation means 9 and actuating rods 8.

Figure 4:
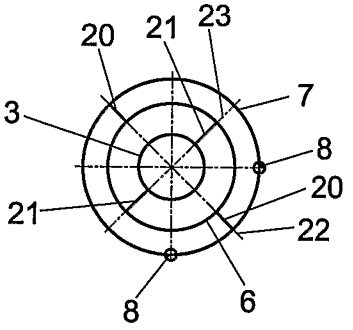

The first axis of rotation 23 and second axis of rotation 22 are advantageously arranged perpendicular, as best seen from FIG. 4. The actuating rods 8 are attached to the outer ring 7 angularly displaced from the axes of rotation 22, 23 whereat the angular displacement of the actuating rods 8 is preferably 90° and the angular displacement of the actuating rods 8 to the axes of rotation 22, 23 is preferably ±45° or 0°, but may be in the range of 0° to ±90°. With such an arrangement, the movements of the inner ring 6 and the outer ring 7 and therefore also of the movable charging means 4 in the form of a spout can easily be described by basic mutually dependent mathematical functions. This allows for an easy integration into a charging material distribution control system and the position of the outer ring 7 (and consequently also of the movable charging means 4 in the form of a tubular spout) can easily be controlled in a high speed closed loop control system to achieve a smooth movement of the movable charging means 4 in the form of a spout.

Furthermore, a shielding means 13 is provided around the inner and outer ring 6, 7 in order to protect the gimbal suspension 2 against heat and dust in the enclosure 30. The shielding means 13 can be a ring surrounding the gimbal suspension 2 or part thereof. The shielding means 13 can also be used to protect the actuating rods 8 or parts thereof.

The actuating drive, comprising the pressure cylinder 10 and the movement transformation means 9, is separated from the gimbal suspension 2 and can be arranged outside the enclosure. This allows single parts of the distribution device 1 to be replaced or maintained without the need for replacing or dismantling the complete distribution device 1.

Figure 2:
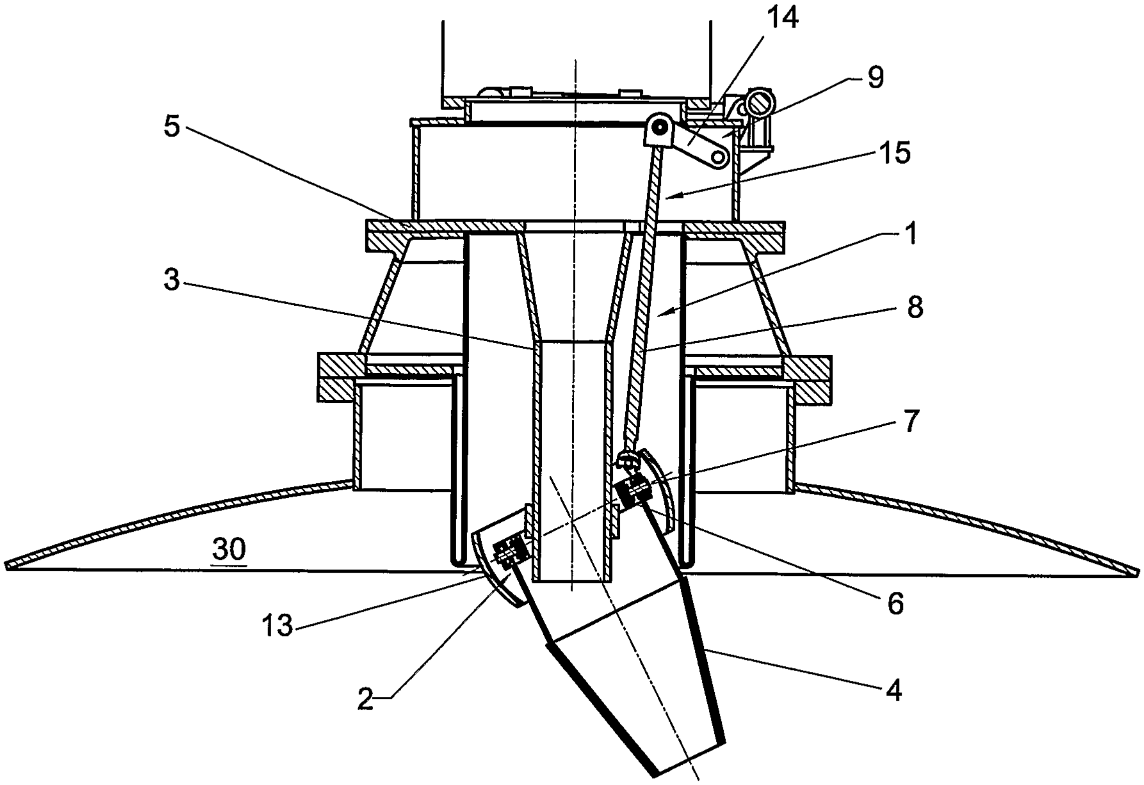
FIG. 2 shows an arrangement of the inventive device in a furnace.
Figure 3:
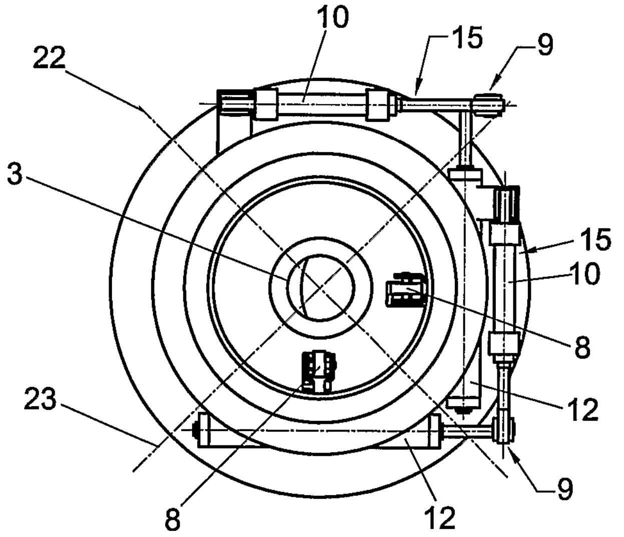
FIG. 3 is a top view of the inventive device and FIG. 4 is a schematic top view of the inventive device.

FIGS. 2 and 3 show the charging material distribution device in its operation position on top of an enclosure 30 in the form of a furnace (or reactor or similar) with top charging. Charging material, e.g. coal, is fed through a feeding conduit (not shown), e.g. a coal screw conveyor, and falls down into the fixed charging means 3 in the form of a chute and then further into the moveable charging means 4 in the form of a spout. By moving the movable charging means 4 in the form of a spout with the actuating means according to a certain pattern, the charging material can be distributed in the enclosure 30 in the form of a furnace.

The invention claimed is:

1. A device for distributing material in an enclosure, the device comprising:

a fixed charging device configured to receive the material at a first entrance of the fixed charging device and to pass the material out of an opening at a first exit of the fixed charging device;

a movable charging device configured to receive the material from the fixed charging device at a second entrance of the movable charging device and to pass the material out of a second exit of the movable charging device, wherein the first exit of the fixed charging device is located within an opening at the second entrance of the movable charging device, and the movable charging device is movably mounted at the opening of the first exit of the fixed charging device with a gimbal suspension on which the movable charging device is suspended; and at least two actuators configured to actuate the gimbal suspension, wherein the gimbal suspension includes:

an inner ring that is tiltably arranged on a first tilting device, wherein the first tilting device is mounted on the fixed charging device at the first exit of the fixed charging device and is configured to facilitate tilting of the inner ring on a first axis of rotation, and an outer ring that is tiltably arranged on a second tilting device, wherein the second tilting device is mounted on the inner ring and is configured to facilitate tilting of the outer ring on a second axis of rotation, the outer ring is attached to the moveable charging device at the second entrance of the moveable charging device, and wherein a first actuator of the at least two actuators comprises at least one of an actuating rod and a pressure cylinder that is attached to the outer ring and a second actuator of the at least two actuators comprises at least one of an actuating rod and a pressure cylinder that is attached to the outer ring, and the first actuator is angularly displaced from the second actuator around an axis of at least the fixed charging device.

2. The device according to claim 1, wherein each of the actuators comprises an actuating rod and the actuating rods are angularly displaced from the first and the second axis of rotation.

3. The device according to claim 1, wherein the first and the second axes of rotation are arranged perpendicularly.

4. The device according to claim 1, wherein the first actuator comprises a first actuating rod and the second actuator comprises a second actuating rod, and the angular displacement of the first actuating rod from the second actuating rod is substantially 90°.

5. The device according to claim 4, wherein the angular displacement of the first actuating rod from the first axis of rotation is in the range of 0° to ±90°.

6. The device according to claim 1, wherein each of the actuators comprises an actuating rod and the actuating rods are arranged vertically along an axis of at least the fixed charging device.

7. The device according to claim 1, wherein each of the actuators comprises an actuating rod, the device further comprising a driver configured to drive each of the actuating rods for moving the actuating rods vertically.

8. The device according to claim 7, wherein the driver comprises a pressure cylinder arranged horizontally with respect to a vertical axis of at least the fixed charging device, and a movement transformer configured to transform the horizontal movement of the pressure cylinder into the substantially vertical movement of the actuating rod.

9. The device according to claim 1, wherein the moveable charging device comprises a tubular spout.

10. The device according to claim 1, wherein each of the actuators comprises an actuating rod, the device further comprising a shield shaped and positioned for protecting at least one of the gimbal suspension and the actuating rods against heat or dust in the enclosure.

11. The device according to claim 1, further comprising a control system operable for controlling the movement of the moveable charging device.

12. The device of claim 5, wherein the angular displacement is substantially ±45°.

13. The device of claim 11, wherein the control system is a high speed closed loop control system.

* * * * *

UNITED STATES PATENT AND TRADEMARK OFFICE

CERTIFICATE OF CORRECTION

PATENT NO. : 8,419,336 B2
APPLICATION NO. : 11/720290
DATED : April 16, 2013
INVENTOR(S) : Fletcher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this
First Day of September, 2015

Michelle K. Lee
*Director of the United States Patent and Trademark Office*